| United States Patent [19] | [11] Patent Number: 4,767,235 |
| Caradonna et al. | [45] Date of Patent: Aug. 30, 1988 |

[54] PREFABRICATED COMPOSITE ELEMENT FOR THE BUILDING OF A SEA WALL

[75] Inventors: Giuseppe Caradonna, Recanati; Antonio Ferruccio, 76 Via Gherarducci, I-62019 Recanati, both of Italy

[73] Assignee: Antonio Ferruccio, Recanati MC, Italy

[21] Appl. No.: 79,229

[22] Filed: Jul. 28, 1987

[30] Foreign Application Priority Data

Jul. 29, 1986 [IT] Italy ............................ 48324 A/86

[51] Int. Cl.$^4$ ............................................. E02B 3/06
[52] U.S. Cl. ......................................... 405/33; 405/35
[58] Field of Search ............... 405/15, 21, 25, 30, 405/33, 34, 35, 248, 284

[56] References Cited

U.S. PATENT DOCUMENTS

| 1,969,123 | 8/1934 | Doble | 405/28 |
| 2,099,249 | 11/1937 | Wood | 405/33 |
| 2,191,924 | 2/1940 | Humphrey | 405/33 |
| 2,387,965 | 10/1945 | Wood | 405/34 |
| 2,731,799 | 1/1956 | Lange et al. | 405/35 |
| 4,341,489 | 7/1982 | Karnas | 405/35 |

FOREIGN PATENT DOCUMENTS 1958814  4/1971  Fed. Rep. of Germany .

OTHER PUBLICATIONS

"Precast Concrete Jetties Create Beaches and Prevent Shore Erosion", Sydney M. Wood, Concrete, Aug. 1982, pp. 2–4.

*Primary Examiner*—David H. Corbin
*Attorney, Agent, or Firm*—Browdy and Neimark

[57] ABSTRACT

A prefabricated composite element for building, together with a plurality of similar elements, a breakwater sea wall comprising a pole having a poligonal cross section with a pointed tip, supporting a plurality of breakwater arms threaded in succession upon the pole in a progressively offset manner according to the edges of the pole.

6 Claims, 3 Drawing Sheets

PREFABRICATED COMPOSITE ELEMENT FOR THE BUILDING OF A SEA WALL

DESCRIPTION

Background of the invention

1. Field of the invention

The present invention relates to a prefabricated composite element for the building of a sea wall.

A serious problem affecting shores of sand, earth and gravel is the erosion by the wave motion which may cause considerable damage, sometimes even disastrous, to the shore and the manufacts standing thereon.

The above has led a number of researchers to study protective structures to dissipate, or at least reduce the wave force which is the main cause of the erosion.

2. Description of the prior art

Among the systems envisaged for counteracting said erosion effect on the shores, the oldest and most conventional is the "breaking of the wave motion" by the building of artificial reefs generally formed with natural or artificial blocks piled one upon the other.

The above mentioned artificial reefs, however, have a number of drawbacks, among which above all an excessive cost can be cited, related to their reduced duration in time.

In fact the momentum of the wave motion continuously modifies the conformation of the generally sandy sea bed, on which the artificial reefs rest, so that falls and displacements of the block components are caused, which in time reduce or even cancel the efficiency of such protections. To this, not only the wave force breaking against the reef makes its contribution, but also the backwash force of the water overtopping the reef itself.

Additional drawbacks associated to the above mentioned artificial reefs consists in the modification of the conformation of many shores, as well as the water pollution of the fore shore caused by water stagnation.

Summary of the invention

An object of the present invention is to provide a prefabricated composite element for forming, in combination with a plurality of similar elements, a breakwater sea wall able to break, deviating and slowing down the wave motion to make it lose at least that part of its power which is liable to do damage and at the same time to hold a considerable amount of debris materials for the refilling of the foreshore lying behing.

To this object the present invention provides a concrete prefabricated composite element for forming a breakwater sea wall, comprising a hole to be driven down into the sea bed and a plurality of breakwater arms, characterized in that:

(a) said pole has an horizontal cross section of a regular poligonal shape;

(b) said breakwater arm is formed with a base having substantially horizontal upper and lower faces with a bore through said faces, said bore having a profile similar to said cross-section of the pole, for threading said arm onto the pole; a raised portion on said upper face embracing said bore; a recess on said lower face, complementary to said raised portion for receiving the raised portion of an underlying arm; and a wedge shaped elongated body integrally and laterally projecting from said base, said arms being assembled upon the pole in an overlying relationship and angularly offset by an angle equal to or a multiple of the angle distance of two adjacent vertexes of the pole poligonal cross section.

Brief description of the drawings

The present invention will be better illustrated hereinafter by a description of a preferred embodiment given as an example in a non-restrictive way, with reference to the accompanying drawings, in which.

Description of the preferred embodiment

Figure 4:
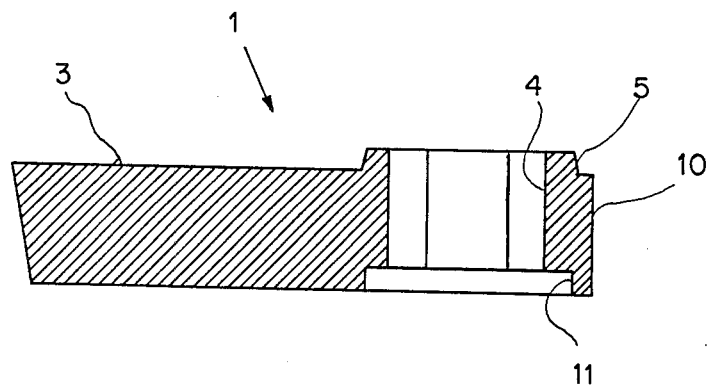
FIG. 4 is a cross section along line IV—IV on FIG. 1.

Referring to the drawings, in FIGS. 1 and 4 one of the breakwater arms, generally indicated with 1, is shown, and in FIG. 2 the pole, generally indicated with 2, is shown, for supporting a plurality of breakwater arms 1, overlaid in succession according to progressively offset orientations, as will be illustrated hereinafter, for building a composite element of the present invention. The element serves the purpose, together with a plurality of similar suitably placed elements, of forming a sea wall barrier of the "permeable" type, i.e. composed of elements which let the waves pass while breaking them, differently from conventional breakwater barriers of "closed" type formed by piled blocks.

The breakwater arm 1 consists of a base portion 10 and an elongated wedge shaped body portion 3 prefabricated of vibrated reinforced concrete, compounded so as to withstand in the sea environment without degradation during time.

In the base 10 a bore 4 is provided, preferably of hexagonal shape, placed with two opposite angles aligned along the horizontal axis of the arm 1.

Around the bore 4, in concentric relationship thereto, on the upper face of the base 10 a raised portion 5 is formed, preferably of frustoconical shape.

On the lower face of the base 10 a recess 11 is provided of a complementary shape to the raised portion 5. The recess 11 serves the purpose of fittingly receiving the raised portion 5 of an underlying breakwater arm, so as to engage the two arms one with the other.

Figure 1:
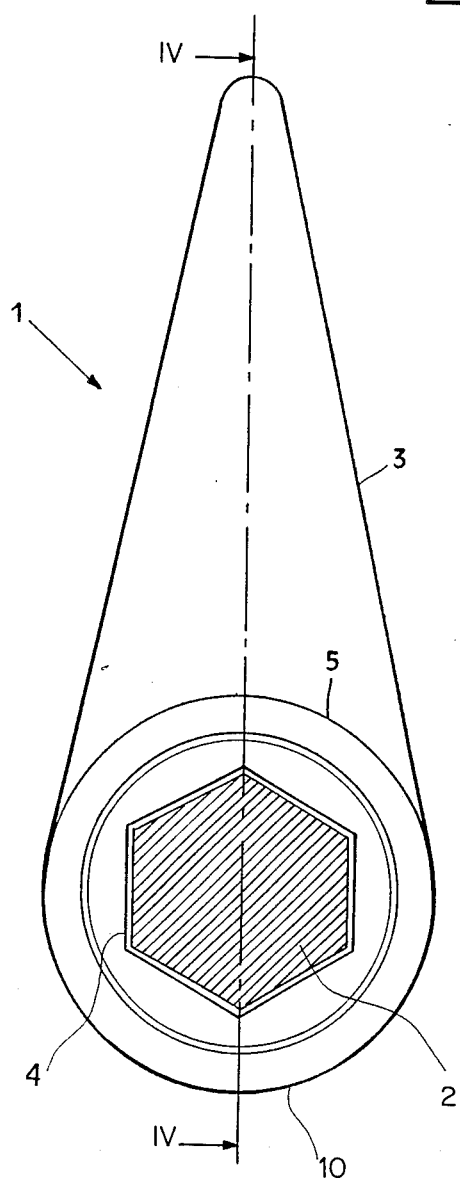
FIG. 1 is a top plan view of a breakwater arm of the composite element of the invention.
Figure 2:
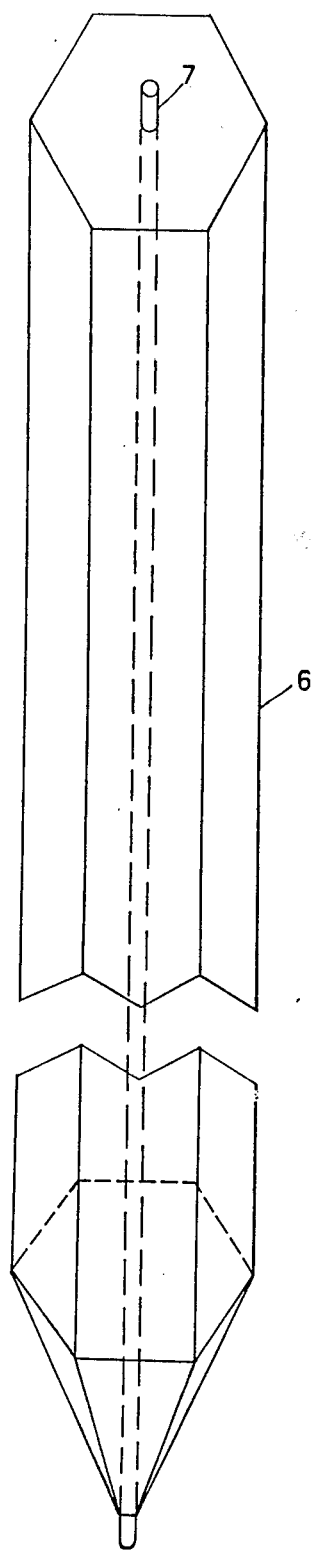
FIG. 2 is an isometric view of the pole of the composite element of the invention.

The pole 2 is formed with an upright 6, made of the same material mentioned above for the arm 1, having a preferably hexagonal cross section so sized as to fit through the bore 4, as shown in cross section on FIG. 1. The pole 2 has a pointed lower tip for easily driving it down into the sea bed.

Into the pole 2 a tube 7 is embedded, axially extending from one end to the other, fitted to effect the driving down operation by the so-called "jet" system, i.e. by means of powerful water or pressurized air jets introduced through said tube 7, which dig the sandy sea bed while the pole 2 is driven down.

Figure 3:
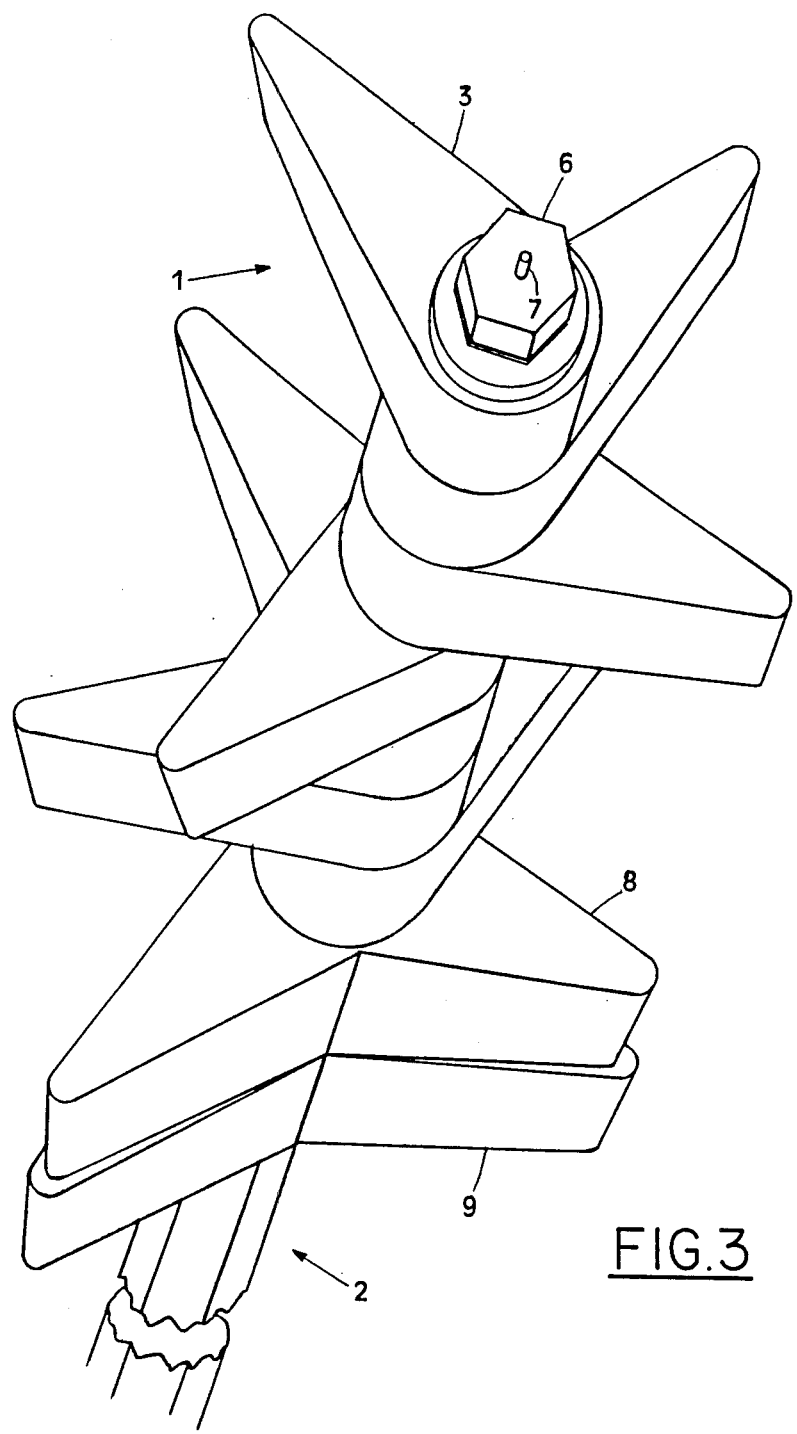
FIG. 3 is a perspective view of the composite element of the invention assembled for operation.

In FIG. 3 the composite element of the invention is shown with its assembled components comprising, in the present example, six arms 1 threaded through the respective bores 4 onto the pole 2, overlying one on the other through their respective raised portions 5 and recesses 11 and progressively orientated about successive edges of the pole 2 so as to form a star shaped assembly with six angularly offset points lying on the same number of vertically offset, parallel planes.

As can be seen in FIG. 3, the lowest arm 1 of the pile rests on a first star shaped body 8 having three points displaced by 120° one to the other, which in turn is overlaid on a second star shaped body 9 similar to the first. Said star shaped bodies 8 and 9 form a basement resting on the sea bed, for the herein before described composite element.

Whereas in the drawings the bore 4 and the pole 2 have been illustrated of hexagonal section, they could also have a different poligonal section, such as from triangular up to octagonal, depending on the diameter and the length of the pole.

Moreover, whereas the raised portion 5 and the recess 11 have been illustrated as frustoconical, they could also be realized with a potential configuration concentric to the configuration of the bore 4.

On installation, firstly the poles 2 are driven down into the sea bed for about two thirds of their length, placed at pre-established regular intervals on a number of rows substantially parallel or curved with respect to the shore.

After threading the basement star shaped bodies 8 and 9 on to each pole 2, the arms 1 are successively assembled simply overlying them one upon the other and then engaging their raised portions 5 in their recesses 11. Each arm is orientated in the previously illustrated manner and the number of arms forming the pile is determined by the depth of the water in which they are placed.

Figure 5:
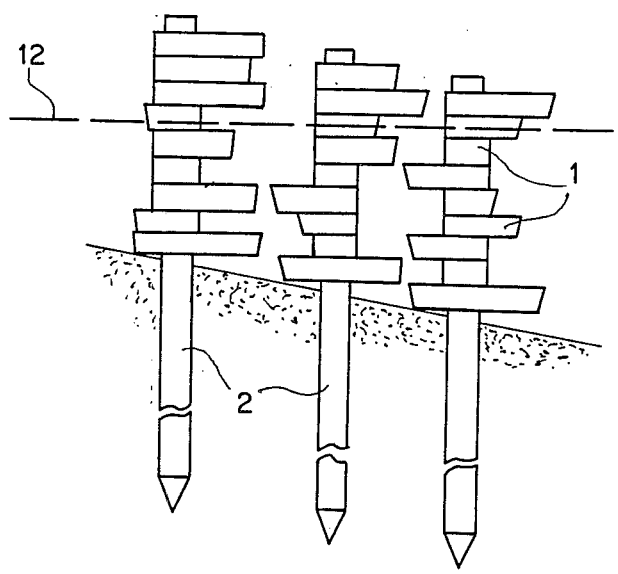
FIG. 5 shows an example of installation of elements according to the invention.

An example of an arrangement of elements according to the invention is shown in FIG. 5. Preferably the element should stand above the sea mean level (indicated in 12 on FIG. 5) by about the same height as the height of the breaking wave.

In addition the poles in different rows are preferably offset seawards and they have offset heights with respect to the sea level.

From practical tests it was possible to appreciate the considerable advantages which can be obtained with a sea wall formed by composite elements of the present invention as indicated herein below.

A considerable refilling of the foreshore behind the barrier has been verified;

the protective action involved a shore length not less than at least three times the length of the barrier;

no erosion of the shore at the ends of the protective length has been noted;

the layer which is formed behind the barrier does not cause water stagnation, so that no decomposition of organic substances is promoted;

the shore which is formed behind and at the sides of the barrier shows valuable features useful for bathing;

the barrier shows the utmost flexibility of application and simplicity of recovery for possible re-use in another form on in another place, as the installed structure is easily disassembled and removed.

We claim:

1. A reinforced concrete prefabricated composite element for building a breakwater sea wall, consisting of a pole to be driven down into the sea bed and a plurality of lateral breakwater arms, characterized in that:
   (a) said pole has a horizontal cross section in the form of a regular poligon;
   (b) each said breakwater arm is formed with a base having substantially horizontal upper and lower faces, with a bore through said faces, said bore having a profile similar to said cross section of the pole for threading said arm onto the pole;
   a raised portion on said upper face embracing said bore;
   a recess on the lower face complementary to said raised portion for receiving said raised portion of an underlying arm; and
   a wedge shaped elongated body integrally and laterally projecting from said base, said arms being assembled on the pole in overlying relationship and angularly offset by an angle equal to or a multiple of the angle distance of two adjacent vertexes of said poligonal cross section of the pole.

2. Element according to claim 1, wherein said pole has, embedded therein, an open longitudinal pipe for the passage of pressurized fluid for the driving down of the pole.

3. Element according to claim 1, wherein said cross section of the pole and the bore in said base, is a regular hexagon.

4. Element according to claim 1, wherein said pole has a pointed lower tip for easing the driving down.

5. Element according to claim 1, wherein said raised and recessed portions of the base have a frustoconical configuration.

6. Element according to claim 1, wherein said lowermost arm rests on a body of star shaped configuration threaded upon the pole and resting on the sea bed.

* * * * *